United States Patent [19]
Brichard et al.

[11] 4,185,960
[45] Jan. 29, 1980

[54] SUPER-OXIDIZED SOLID SODIUM PERBORATE AND PROCESSES FOR ITS MANUFACTURE

[75] Inventors: Jean Brichard, Vilvoorde; Jean-Claude Colery, Brussels, both of Belgium

[73] Assignee: Interox, Brussels, Belgium

[21] Appl. No.: 895,274

[22] Filed: Apr. 10, 1978

[30] Foreign Application Priority Data

Apr. 8, 1977 [LU] Luxembourg ............................ 77095

[51] Int. Cl. ........................... C01b 15/12; C11d 3/39; C11d 3/395
[52] U.S. Cl. ......................................... 8/111; 252/99; 252/186; 423/281
[58] Field of Search ................... 252/186, 99; 423/281, 423/273; 8/111

[56] References Cited

U.S. PATENT DOCUMENTS

| 3,598,524 | 8/1971 | Reilly | 423/281 |
| 3,661,510 | 5/1972 | Winkley | 423/281 |
| 3,832,447 | 8/1974 | Dillenberg et al. | 423/281 |
| 3,985,862 | 10/1976 | Knippschild et al. | 423/281 |
| 4,115,519 | 9/1978 | Brichard et al. | 423/281 |

FOREIGN PATENT DOCUMENTS 1590710 9/1960 France.
798217 10/1955 United Kingdom .................... 423/281
845846 2/1959 United Kingdom.

Primary Examiner—Benjamin R. Padgett
Assistant Examiner—Irwin Gluck
Attorney, Agent, or Firm—Spencer & Kaye

[57] ABSTRACT

Superoxidized solid sodium perborate contains more than 17 wt.% active oxygen and less than 1.4 atoms hydrogen per active oxygen atom. The superoxidized solid sodium perborate in particle form is prepared by simultaneously introducing, into a fluidized bed dryer containing seeds of dimensions smaller than those of the perborate particles which are to be obtained, an aqueous solution containing hydrogen peroxide in concentrations above 30 wt.% and an aqueous solution containing sodium metaborate in such quantities that the molar ratio between the hydrogen peroxide and the sodium metaborate introduced into the fluidized bed is above 1.12. The water present in the aqueous solutions is evaporated by means of a fluidizing gas.

15 Claims, 2 Drawing Figures

SUPER-OXIDIZED SOLID SODIUM PERBORATE AND PROCESSES FOR ITS MANUFACTURE

BACKGROUND OF THE INVENTION

The present invention relates to a new solid sodium perborate which is particularly rich in active oxygen. It also relates to a process for its manufacture and use as a bleaching agent.

The majority of processes for the production of super-oxidized sodium perborate involve drying beyond the monohydrate phase and give effervescent products which release molecular oxygen as soon as they come into contact with water, but have a low active oxygen content as determined by titration with permanganate.

It has, however, been possible to produce super-oxidized perborate with a high active oxygen content by the direct reaction of excess hydrogen peroxide with a borate in an aqueous medium, as disclosed in British Pat. No. 798,217 filed on Oct. 21, 1955 by Henkel and Cie. GmbH, or in an organic medium as disclosed in French Pat. No. 1,590,710 filed on Sept. 30, 1968, by Sandoz S. A. However, these products appear to owe their high active oxygen content to the presence of hydrogen peroxide which is occluded in the solid substance. Consequently, they have a low resistance to abrasion. Moreover, these products contain two hydrogen atoms per active oxygen atom.

SUMMARY OF THE INVENTION

There has now been discovered, in accordance with the present invention, a new super-oxidized solid sodium perborate particularly rich in active oxygen, which differs from the known products in that it has a low hydrogen content in relation to the active oxygen content, and which has a high resistance to abrasion.

The present invention provides a super-oxidized solid sodium perborate which contains more than 17 wt.% active oxygen and less than 1.4 hydrogen atoms per active oxygen atom.

The term "active oxygen" as used herein means oxygen which can be determined by titration with potassium permanganate.

The present invention also provides a process for the manufacture of the super-oxidized solid sodium perborate described above. The process comprises introducing simultaneously into a fluidized bed dryer containing seeds of dimensions smaller than the particles of solid product to be obtained, an aqueous solution containing hydrogen peroxide in concentrations above 30 wt.% and a solution containing sodium metaborate in such an amount that the molar ratio between hydrogen peroxide and sodium metaborate introduced into the fluidized bed is above 1.12, and evaporating the water present in the aqueous solutions by means of fluidizing gas.

DETAILED DESCRIPTION OF THE INVENTION

Figure 1:
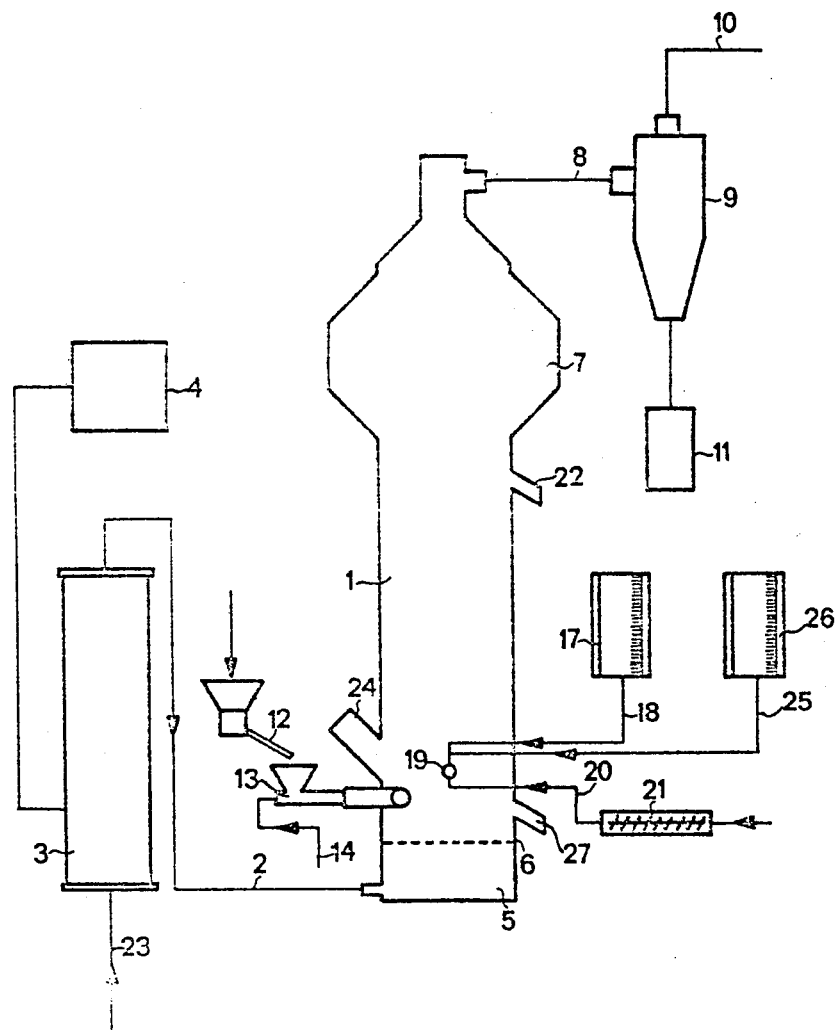
FIG. 1 shows one embodiment of an apparatus for performing the method of the present invention.

The active oxygen content of the product of the present invention is generally between 17 and 32 wt.%, and frequently between 17 and 28 wt.% in relation to the total weight of the product. It is preferably between 22 and 27 wt.%. In general, the hydrogen content is such that 0.7 to 1.4 hydrogen atoms, and frequently 0.9 to 1.3 hydrogen atoms are present per active oxygen atom.

Although it has not been possible to accurately define the exact chemical structure of the products obtained, it appears that the new perborates according to the invention correspond to an empirical formula of the type $(NaBO_3.H_2O_2)_x.(NaBO_3.H_2O)_y.(NaBO_3)_z$ in which x, y and z have varying values such as $$1 \geq \frac{x}{x+y} \geq 0.43 \text{ and } 0 \leq \frac{z}{(x+y)} \leq 0.2.$$

However, this interpretation of the analytical results of the product is not to be understood as a limitation and is only given as an indication and without prejudice.

Super-oxidized solid sodium perborate which is the subject matter of the present invention is usually present in the form of particles of greatly varying dimensions. In general, it is present in the form of particles whose dimensions are between 0.01 and 20 mm and frequently between 0.05 and 5 mm. These particles may possibly be agglomerated in the form of granules or tablets.

In the practice of the process of the present invention, the aqueous hydrogen peroxide solution and the aqueous sodium metaborate solution preferably are used in such amounts that the molar ratio of hydrogen peroxide to sodium metaborate is above 1.15. The best results are obtained when the ratio is between 1.2 and 3. In order to obtain super-oxidized solid sodium perborate with an active oxygen content between 22 and 27 wt.%, this molar ratio is advantageously between 1.7 and 3.

The aqueous solution containing hydrogen peroxide may contain greatly varying quantities of hydrogen peroxide. Aqueous solutions containing 30 to 90 wt.% hydrogen peroxide, and preferably 35 to 80 wt.% are used advantageously.

Higher concentrations of hydrogen peroxide can be used, but this requires special precautions in order to prevent any risk of explosion.

The aqueous solution containing hydrogen peroxide may possibly also contain certain additives which are particularly likely to improve its stability, such as for example those indicated in the publication by W. C. Schumb et al, *Hydrogen Peroxide*, Reinhold Publ. Corp. New York, 1955. Among these, sodium stannate and phosphate are highly suitable. Although these stabilizers are not indispensable, they are frequently added. These stabilizers are generally used in ratios of 0.001 to 1 wt.% of the weight of hydrogen peroxide as 100%. It is also possible to add other additives to the hydrogen peroxide solution, such as, for example, stabilizers or preliminary stabilizers of perborate such as those indicated by W. Machu, *Das Wasserstoffperoxyd und die Perverbindungen*, Springer, Vienna, 1951, and, in particular, e.g. magnesium sulfate as well as corrosion inhibitors such as nitrates and pH adjusting agents. The perborate stabilizers can be used in ratios of 1 to 50 g stabilizer per kg hydrogen peroxide as 100%. However, these additives are not indispensable.

The aqueous solution containing sodium metaborate may also contain greatly varying amounts of sodium metaborate within the limits of solubility of the latter, these limits being a function of the solution temperature. In general, solutions containing 5 to 40 wt.% sodium metaborate calculated as $NaBO_2$ are used. The solutions obtained on an industrial scale during decomposition of boron-containing minerals by sodium hydroxide solution are particularly suitable. These solutions usually contain 10 to 35 wt.% sodium metaborate calculated as $NaBO_2$. It is also possible to add other additives to the metaborate solution, such as, for example, stabilizers or preliminary stabilizers of perborate such as those indicated by W. Machu, and in particular alkali silicates. The perborate stabilizers may be used in ratios of 1 to 50 g stabilizer per kg sodium metaborate. However, these additives are not essential.

It is also possible to add to either the solution containing hydrogen peroxide or the solution containing sodium metaborate, or to both, without this being essential, an additive which makes it possible to prevent premature crystallization of the perborate in the spray-nozzle during the introduction of the two solutions into the fluidized bed by a single nozzle. Several additives can be used for this purpose, such as, for example, sodium hexametaphosphate. Also, a surface active agent can be added to at least one of the solutions of sodium metaborate or hydrogen peroxide for the purpose of obtaining super-oxidized sodium perborate with an increased rate of dissolution. Examples of surface active agents suitable for this purpose are given in the publication, *Surface Active Agents*, by A. M. Schwarz. The amount of surface active agent used for this purpose generally lies between 0.01 and 2 wt.% of the weight of super-oxidized sodium perborate.

The reagent solutions are introduced simultaneously into the fluidized bed, either separately through two separate nozzles, or through a single nozzle, pre-mixing being carried out inside or at the outlet of the spray-nozzle. These solutions are introduced into the fluidized bed in any known manner. It is, for example, possible to use pneumatic injection devices such as atomizers for this purpose.

The temperature of the solutions may vary within relatively wide limits. Preferably, the temperature of the solutions do not exceed that of the fluidized bed, so that untimely crystallization in the nozzles is prevented when concentrated solutions are used. In general, temperatures between room temperature and 70° C., preferably between 15° and 60° C. are used. The temperatures of the two solutions need not necessarily be the same.

The temperature of the fluidized bed does not exceed the temperature at which super-oxidized sodium perborate begins to decompose, i.e. approximately 95° C. The temperature of the fluidized bed generally lies between ambient temperature and 95° C., usually between 35° and 90° C., and preferably between 45° and 80° C. The temperature of the air or any other carrier gas introduced at the bottom of the fluidized bed, for example, through a gauze or a distribution plate, may vary within wide limits depending in particular on the temperature which is to be maintained in the bed, the amount of water to be eliminated and the rate of flow of the carrier gas. The temperature of the air or any other carrying gas frequently lies between 105° and 250° C. However, other temperatures can also be used.

When starting up the fluidization, seeds are introduced into the bed. The dimensions of these seeds are less than those of the super-oxidized sodium perborate granules which are to be obtained. These seeds are preferably super-oxidized sodium perborate particles. Particles of other inorganic persalts such as sodium percarbonate, sodium perborate tetrahydrate, sodium perborate monohydrate or phosphate perhydrates can also be used as seeds, since they equally ensure a homogeneous distribution of the active oxygen in the granules.

In the course of the operation, the presence in the fluidized bed of seeds of dimensions smaller than those of the granules which are to be obtained is also indispensable. These seeds consist at least partly of fine-super-oxidized sodium perborate normally produced in the bed. The proportion of seeds can also be increased by introducing at will fine super-oxidized sodium perborate into the bed or by mechanical destruction in the bed itself of a portion of granules already formed or also, by using these two methods simultaneously.

The fine super-oxidized sodium perborate particles which can be introduced into the bed may be derived from rejected oversized product after pulverizing outside the fluidized bed of the excessively large granules of super-oxidized sodium perborate produced in the dryer, from the recycling of fines carried out of the bed by the fluidizing gas, from product obtained according to another process, and from product obtained by possible grinding of particles of super-oxidized sodium perborate, or from the simultaneous use of several of these possibilities.

It is also possible to equip the fluidized bed dryer with one or several devices such as grinders, agitators or scrapers which mechanically destroy the agglomerates and cause the simultaneous formation of small particles. These devices make it also possible to prevent the bed from becoming compressed and solidified. In fluidized beds of large dimensions, these devices are, however, hardly used because there is no formation of agglomerates. In this case, it is generally preferred to introduce fine recycled or rejected oversized super-oxidized sodium perborate into the fluidized bed when the proportion of seeds in the bed is to be increased. The technique which is preferably used to increase the proportion of particles in the bed consists in recycling the fines entrained outside the bed by the fluidizing gas.

The feed of solid seed material can be ensured in any known way, e.g. by means of a Venturi system. The solid seed material generally has a mean particle diameter of less than 0.4 mm, usually between 0.01 and 0.35 mm. It should be noted that these values are only given as examples and that seed particles of different dimensions can be used.

The dimensions of the granulated products depend in particular on the proportion of seeds present in the bed, the particle size being inversely proportional to the content of seeds. The size of the granules will therefore be inversely proportional to the amount of fine super-oxidized sodium perborate introduced deliberately into the bed and to the rate of use of the equipment for the mechanical destruction of the granules (grinders) which may be installed in the bed.

The dimensions of the granulated products depend also on the gas pressure in the spray nozzle(s) which make it possible to introduce the solutions into the fluidized bed, the grain size being inversely proportional to the pressure.

The adjustment of the dimensions of the granules to the desired value can therefore be easily achieved by varying the proportion of the seeds in the bed either by the introduction of seeds or by the internal destruction of granules or by varying the pressure in the nozzles or indeed by using these two methods simultaneously.

The process according to the present invention can be carried out continuously or discontinuously. The fluidized bed dryer can be cylindrical, cylindro-conical, parallelepipedical or have any other form which permits the application of the process.

The discharge of the granules can be effected by any known device, for example, by elutriating through the bottom of the dryer or through a lateral outlet fitted at the base of the dryer or by overflow through a lateral outlet at the top of the bed, this determining the height of the fluidized bed.

The gases leaving the fluidized bed pass through a fines separator such as a cyclone. The extracted gases can be discharged into the atmosphere or possibly recycled partly or in full into the fluidized bed after eliminating the water vapor which they contain, by drying or condensation.

The process according to the present invention proves to be particularly advantageous since it makes it possible to obtain solid super-oxidized sodium perborate with a very high content of active oxygen, in one stage. Also, it has the advantage of making possible the production of a product which has satisfactory free-flowing properties and a low abrasion index. Also, it makes it possible to prepare super-oxidized sodium perborate with particles of predetermined dimensions in such a way that they are compatible with the application envisaged. Finally, the hydrogen peroxide losses are low and generally do not exceed 10 wt.%.

Figure 2:
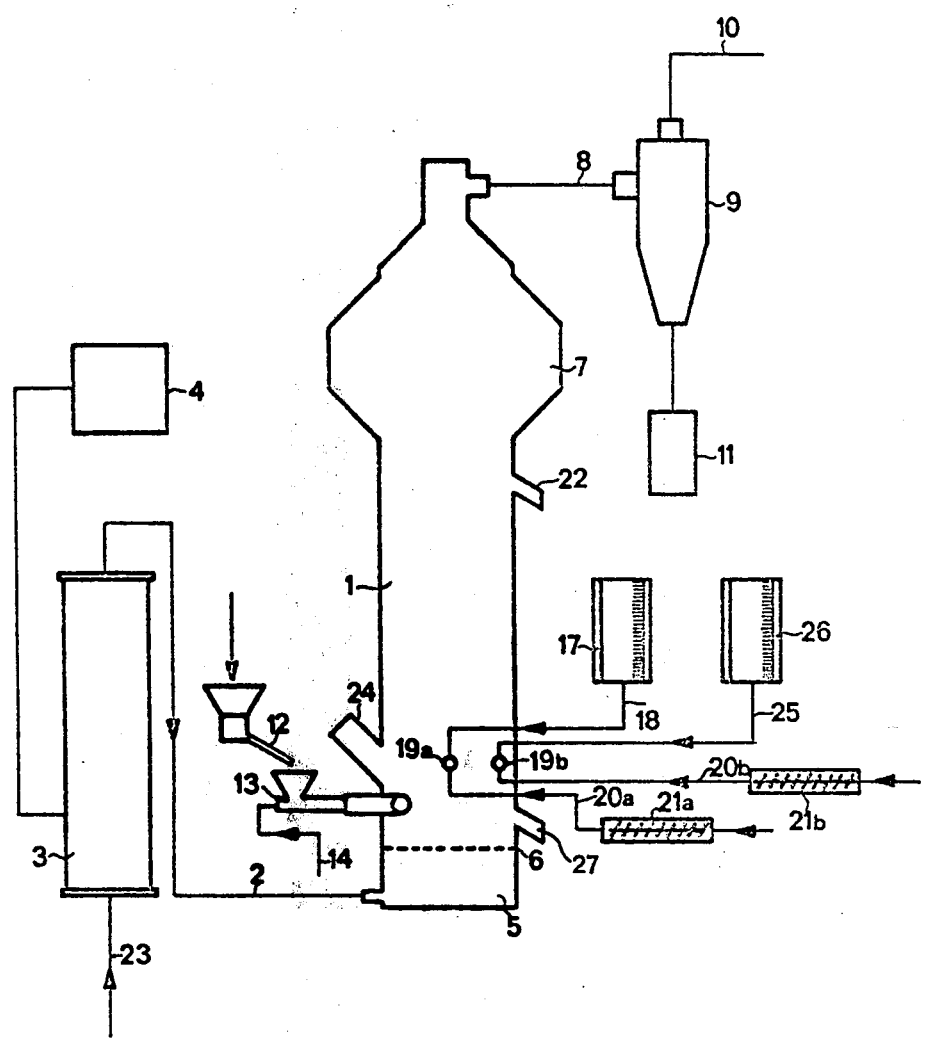
FIG. 2 shows an alternative embodiment of an apparatus for performing the method of the present invention.

The process according to the present invention can be carried out in equipment such as for example those illustrated in FIGS. 1 and 2. These figures relate to practical methods of executing the process according to the invention.

FIG. 1 shows a bed of particles 1 fluidized by means of a gas such as air which passes into the system through a gas line 2 after having been preheated in a preheater 3 which is fed with air through a line 23 and the temperature is controlled by means of a regulator 4. The hot air passes into an air box 5, through a grid 6 and penetrates into fluidized bed 1 above which there is a zone 7 which makes it possible to pass a portion of the fines back to the fluidized bed 1. A connection 24 makes it possible to introduce a grinder into the bottom of the bed.

The gases leaving the fluidized bed pass through a gas outlet line 8 into a fines collector or cyclone 9 and leave the equipment through an air discharge ventilator line 10. The fines are recovered in a vessel 11.

The seeds which are formed in particular by all the fines recovered in vessel 11 are passed via a vibrating conduit 12 into fluidized bed 1 by means of a Venturi tube 13 supplied with compressed air through a line 14.

Through a line 18, the solution of hydrogen peroxide leaves a thermostatically controlled storage tank 17 which is maintained at the desired temperature and, through a line 25, the solution containing sodium metaborate leaves a thermostatically controlled storage tank 26 which is also maintained at the required temperature. Both temperatures may be identical or different from each other. The two solutions are mixed and atomized into the fluidized bed 1 by means of an atomizer 19 which is supplied with compressed air through line 20, the air being heated in 21.

The granulated product is collected by allowing it to flow through an overflow tube 22 at the top of the bed or elutriating it through a tube 27 at the base of the bed.

FIG. 2 shows a similar piece of equipment to that represented in FIG. 1 except that the single atomizer is replaced by two atomizers.

Through line 18, the solution containing hydrogen peroxide leaves thermostatically controlled storage tank 17 which is maintained at the desired temperature, and is atomized into fluidized bed 1 by means of an atomizer 19a supplied with compressed air through a line 20a, the air being heated in a heater 21a.

Through line 25, the solution containing sodium metaborate leaves thermostatically controlled storage tank 26 which is maintained at the desired temperature, and is atomized into the fluidized bed 1 by means of an atomizer 19b which is supplied with compressed air through a line 20b, the air being heated in a heater 21b.

The other characteristics of the equipment are identical to those of the equipment illustrated in FIG. 1.

The new super-oxidized solid sodium perborate according to the present invention may be advantageously used as an oxidizing agent and bleaching agent. The new perborate is particularly suitable for applications where a slow dissolution of the product in water is desirable in such a way that active oxygen is liberated slowly as the process progresses.

The new super-oxidized solid sodium perborate may also be advantageously used in compositions used for deodorizing, soaking, washing, cleaning, bleaching, dish washing, stain removal, especially of coffee stains, or for cleaning teeth. It can also be used as neutralizing agent for cold perms and as an anti-vesicant.

Compositions which act as bleaching agents generally contain:

0.1 to 90 wt.% super-oxidized solid sodium perborate according to the present invention.

0 to 50 wt.% cationic, anionic or non-ionic surface active agents such as those mentioned in the publication *Surface Active Agents* by A. M. Schwarz and J. W. Perry, or in U.S. Pat. No. 3,159,581.

0 to 50 wt.% of one or several known builders such as polyphosphates, carboxylated polymers, sodium nitrilotriacetate and the salts of ethylene diaminetetraacetic acid.

0 to 20 wt.% of various additives, such as, in particular, enzymes, optical brighteners, soil antiredeposition agents, pH regulators, persalt activators, dyes, perfumes, corrosion inhibitors, tarnishing inhibitors and disinfectants.

The washing, cleaning, soaking or bleaching processes using such compositions are generally carried out at temperatures between 10° and 130° C., and the said compositions are used in a ratio of 0.5 to 20 g/l aqueous bath.

In order to illustrate the invention, without, however, limiting its scope, examples are given below of the production of super-oxidized solid sodium perborate and examples showing the properties of the product.

EXAMPLES 1 TO 3 R

Tests 1 and 2 described below were carried out continuously in an apparatus of the same type as that shown in FIG. 1. The dryer, which has a rectangular cross-section, consists of two sections of different dimensions. The lower section is 30 cm long, 15 cm wide and its height above the air distribution grid 6 is 90 cm, whereas the upper section 7 is 60 cm long, 30 cm wide and 30 cm high. The gas distribution grid 6 consists of a perforated stainless steel sheet, the diameter of the perforations being 0.5 mm. The granules are discharged by allowing them to flow through a lateral connection 22 situated 600 mm from the distribution grid 6.

The bed of particles is fluidized by introducing a flow of hot air through the gas distribution grid 6. Initially, the dryer contains sodium perborate monohydrate obtained by dehydration of sodium perborate tetrahydrate. The mean diameter of this feed is 0.32 mm.

The dryer is fed continuously with aqueous hydrogen peroxide solution and aqueous sodium metaborate solution by an atomizer which extends into the fluidized bed. Apart from magnesium sulfate, the aqueous solution of hydrogen peroxide contains approximately 5 to 100 ppm sodium stannate and comparable quantities of sodium phosphate.

The conditions of continuous operation are given in Table I below.

Test 3R was carried out for comparison. It relates to a method of producing sodium perborate monohydrate. This test was carried out in an apparatus of the same type as that shown in FIG. 1. This time, the fluidized bed has a cylindrical cross section, 152 mm diameter and 915 mm high in the lower section and 305 mm diameter and 300 mm high in the upper section. Tests 1 and 2 were carried out according to the present invention.

cone the large base of which has a diameter of 53 mm and the small base, which is equipped with a shutter capable of opening completely, has a diameter of 21 mm, the height between the bases being 58 mm and the available volume being approximately 60 cm$^3$.

The cylindrical 50 cm$^3$ cup has an inner diameter of 37 mm and a height equal to approximately 46 mm. The base of the hopper is 65 mm above the top of the cup. The method of operation is identical to that described in the A.S.T.M. Standards. The shutter of the hopper is closed and the latter is so filled with the product to be examined and levelled off at the upper edge by means of a rectilinear blade. The cup is placed in the axis of the hopper and the shutter is opened. After allowing the substance to flow out, the cup is levelled off at the upper edge. The apparent bulk density of the free flowing product is equal to the ratio between the weight of the substance in the cup, expressed in kg, and the volume of the cup expressed in dm$^3$.

The active oxygen content of super-oxidized sodium perborate is determined by titration with potassium permanganate.

The "developable" oxygen content of the super-oxidized sodium perborate is determined by measuring the volume of oxygen evolved during the addition of excess water to the dry product.

TABLE I

|  |  | Test 1 | Test 2 | Test 3R |
| --- | --- | --- | --- | --- |
| Rate of flow of fluidizing air | N m$^3$/h | 90 | 90 | 55 |
| Temperature of the fluidized layer | °C. | 70 | 69 | 77 |
| Feed to the atomizers |  |  |  |  |
| Air |  |  |  |  |
| Rate of flow | N m$^3$/h | 11.5 | 11.5 | 2.2 |
| Temperature | °C. | 60 | 60 | 90 |
| Pressure | kg e/cm$^2$ | 4.5 | 4.5 | 1.3 |
| Solution of hydrogen peroxide |  |  |  |  |
| Rate of flow | kg/h | 1.42 | 1.524 | 0.55 |
| Temperature | °C. | 22 | 22 | 25 |
| Concentration of H$_2$O$_2$ | % weight | 50.1 | 50.1 | 26 |
| of MgSO$_4$ . 7H$_2$O | % weight | 1.5 | 1.5 | 0.78 |
| Solution of sodium metaborate |  |  |  |  |
| Rate of flow | kg/h | 2.27 | 1.966 | 1.3 |
| Temperature | °C. | 50 | 50 | 45 |
| Concentration of NaBO$_2$ | % weight | 30.2 | 30.2 | 20.2 |
| Molar ratio on introduction of H$_2$O$_2$/NaBO$_2$ |  | 2.008 | 2.49 | 1.05 |
| Recycling of fines |  |  |  |  |
| Rate of flow of air from Venturi tube | N m$^3$/h | 0.45 | 0.45 | 1.3 |
| Air pressure in Venturi tube | kg e/cm$^2$ | 0.4 | 0.4 | 1.3 |
| Production | kg/h . m$^2$ of the bed | 28.8 | 27.6 | 23 |
| Yield of combined oxygen | % | 94.3 | 91.5 | 100 |

Examination of Products

The different products obtained in Examples 1 and 2, which are referred to respectively as product 1 and product 2 were compared with the product obtained from the comparative Example 3R called product 3R.

The abrasion index with which the present invention is concerned was measured according to the test described in standard ISO/TC 47/WG 11 (secretariat-86) 167 of the British Standards Institute.

The apparent bulk density of the free flowing product with which the present invention is concerned, is determined by a process analogous to that described in A.S.T.M. Standards D 392 38 and B 212 48, which are recommended for the determination of the apparent density of molding powders and metal powders respectively. However, the equipment used is slightly different. It comprises a hopper in the form of a truncated The total content of water, both free and combined, of super-oxidized sodium perborate is obtained by the difference between the loss of weight observed (active oxygen + developable oxygen + water) during a thermogravimetric measurement by means of a thermo-balance, and the content of active oxygen and developable oxygen measured by the method indicated above. The content of elemental hydrogen is of course equal to twice the amount of water (in moles) lost during thermogravimetric measurement.

The contents of the total boron and of borax (Na$_2$B$_4$O$_7$) are determined by titration.

The results obtained are given in Table II below.

TABLE II

| Products | | 1 | 2 | 3R |
|---|---|---|---|---|
| Composition | | | | |
| active oxygen | g/kg | 240.0 | 260.0 | 159.0 |
| developable oxygen | g/kg | 4.2 | 4.9 | 5.0 |
| water | g/kg | 147.8 | 148.1 | 180.0 |
| elementary hydrogen: active oxygen | atom/atom | 1.09 | 1.01 | 2.1 |
| total boron (except for borax) expressed as $NaBO_2$ | g/kg | 588 | 566 | 641.5 |
| borax ($Na_2B_4O_7$) | g/kg | 10.0 | 10.0 | 8.0 |
| stabilizer ($MgSO_4$) | g/kg | 7.9 | 9.5 | 5.0 |
| various (impurities) | g/kg | 2.1 | 1.5 | 1.5 |
| Physical properties | | | | |
| apparent bulk density | kg/dm³ | 1.13 | 1.16 | 0.63 |
| average diameter | mm | 0.320 | 0.350 | 0.690 |
| index of abrasion (ISO standard) | % | 1.5 | 1.5 | 3.5 |

An examination of Table II shows that the products according to the present invention have a high active oxygen content and a much lower hydrogen content than sodium perborate monohydrate. Also, they are characterized by a very high abrasion resistance and a high apparent bulk density.

EXAMPLE 4

The purpose of this example is to illustrate the stability of the product according to the present invention during storage in the presence of other constituents of a detergent powder without enzymes.

Mixtures are used which contain 1.05 g active oxygen and either 10.5 g sodium perborate tetrahydrate (product 4R), or 6.6 g sodium perborate monohydrate obtained according to test 3R (product 3R) or 4.4 g superoxidized sodium perborate obtained in test 1 (product 1) and 42 g of a commercial powder without enzymes, the composition of which is given in Table III.

TABLE III

| Components | g |
|---|---|
| Sodium carbonate | 1.6 |
| Sodium silicate ($Na_2O \cdot 3SiO_2$) | 4.0 |
| Sodium tripolyphosphate ($Na_5P_3O_{10}$) | 13.1 |
| Sodium pyrophosphate ($Na_4P_2O_7$) | 2.7 |
| Sodium orthophosphate ($Na_2HPO_4$) | 0.2 |
| Sodium sulphate | 6.7 |
| Surface-active organic substances | |
| soap | 3.5 |
| sodium alkylsulfate | 1.2 |
| sodium alkylarylsulfonate | 3.7 |
| condensate of ethylene oxide with fatty alcohol | 1.8 |
| various | 3.4 |

After homogenization, the mixtures are introduced into cardboard boxes (11.5×7×2 cm) the front and back of which are covered with a coating of cellulose acetate (permeability 550 g $H_2O/m^2$. day). The boxes prepared in this way are then stored at 28° C. at 70% relative atmospheric humidity for 8 weeks each.

Another series of boxes covered with microcrystalline wax (permeability 5 g $H_2O/m^2$. day) are also prepared and stored at 35° C. at 80% relative atmospheric humidity for 4 to 8 weeks.

After each period of storage, the active oxygen content in the powder is determined by direct titration with $KMnO_4(N/2)$ and the loss of active oxygen is determined in relation to the initial active oxygen.

The results of storage tests are given in Table IV below. They show the remarkable superiority of the products of the present invention in relation to sodium perborate tetrahydrate and sodium perborate monohydrate.

TABLE IV

| | | % Active Oxygen Lost | | | |
|---|---|---|---|---|---|
| Characteristics of | | 28° C.-70% Rel. Hum. | | 35° C.-80% Rel. Hum. | |
| percompounds used | Product | 4 weeks | 8 weeks | 4 weeks | 8 weeks |
| Particles of sodium perborate tetrahydrate | 4R | 2 | 4 | 6 | 14 |
| Particles of sodium perborate monohydrate | 3R | 4 | 5 | 6 | 12 |
| Particles of superoxidized sodium perborate from test 1 | 1 | 3 | 3 | 4 | 6 |

It will be understood that the above description of the present invention is susceptible to various modifications, changes and adaptations, and the same are intended to be comprehended within the meaning and range of equivalents of the appended claims.

What is claimed is:

1. Superoxidized solid sodium perborate which contains more than 17 wt.% active oxygen and less than 1.4 atoms hydrogen per active oxygen atom.

2. Sodium perborate according to claim 1 which contains between 17 and 32 wt.% active oxygen and 0.7 to 1.4 hydrogen atom per active oxygen atom.

3. Sodium perborate according to claim 2 which contains between 17 and 28 wt.% active oxygen and 0.9 to 1.3 hydrogen atom per active oxygen atom.

4. Sodium perborate according to claim 3 which contains 22 to 27 wt.% active oxygen.

5. Process for the production of superoxidized solid sodium perborate in particle form, comprising: simultaneously introducing into a fluidized bed dryer containing seeds of dimensions smaller than those of the perborate particles which are to be obtained, an aqueous solution containing hydrogen peroxide in concentrations above 30 wt.% and an aqueous solution containing sodium metaborate in such quantities that the molar ratio between the hydrogen peroxide and the sodium metaborate introduced into the fluidized bed is above 1.12, and evaporating the water present in the aqueous solutions by means of fluidizing gas.

6. Process according to claim 5 wherein the molar ratio of hydrogen peroxide to sodium metaborate is above 1.15.

7. Process according to claim 6 wherein the molar ratio of hydrogen peroxide to sodium metaborate is between 1.2 and 3.

8. Process according to claim 7 wherein the molar ratio of hydrogen peroxide to sodium metaborate is between 1.7 and 3.

9. Process according to claim 5 wherein the temperature of the fluidized bed is between ambient temperature and 95° C.

10. Process according to claim 5 wherein the aqueous solution containing hydrogen peroxide contains 30 to 90 wt.% of hydrogen peroxide.

11. Process according to claim 10 wherein the aqueous solution containing hydrogen peroxide contains 35 to 80 wt.% hydrogen peroxide.

12. Process according to claim 5 wherein the aqueous solution containing sodium metaborate contains 5 to 40 wt.% sodium metaborate.

13. Process according to claim 12 wherein the aqueous solution containing sodium metaborate contains 10 to 35 wt.% sodium metaborate.

14. Process according to claim 5 wherein the seeds of dimensions smaller than those of the granules which are to be obtained consist at least partly of fine recycled particles of superoxidized sodium perborate.

15. Bleaching process wherein superoxidized solid sodim perborate according to claim 1 is used as the bleaching agent.

* * * * *